(12) United States Patent
Feurer

(10) Patent No.: US 12,370,726 B2
(45) Date of Patent: Jul. 29, 2025

(54) TOOL FOR THE MANUFACTURE OF FOAM PARTS

(71) Applicant: FEURER Febra GmbH, Brackenheim (DE)

(72) Inventor: Markus Feurer, Muggensturm (DE)

(73) Assignee: FEURER Febra GmbH, Brackenheim (DE)

( * ) Notice: Subject to any disclaimer, the term of this patent is extended or adjusted under 35 U.S.C. 154(b) by 63 days.

(21) Appl. No.: 18/284,101

(22) PCT Filed: Feb. 2, 2022

(86) PCT No.: PCT/EP2022/052474
§ 371 (c)(1),
(2) Date: Sep. 26, 2023

(87) PCT Pub. No.: WO2022/218580
PCT Pub. Date: Oct. 20, 2022

(65) Prior Publication Data
US 2024/0157606 A1    May 16, 2024

(30) Foreign Application Priority Data
Apr. 13, 2021   (DE) ..................... 10 2021 109 197.7

(51) Int. Cl.
| | | |
|---|---|---|
| *B29C 33/38* | (2006.01) |
| *B29C 44/34* | (2006.01) |
| *B29C 44/58* | (2006.01) |
| *B33Y 80/00* | (2015.01) |
| *B29K 105/04* | (2006.01) |
| *B29L 31/00* | (2006.01) |

(52) U.S. Cl.
CPC ...... *B29C 33/3842* (2013.01); *B29C 44/3434* (2013.01); *B29C 44/587* (2013.01); *B29C 44/588* (2013.01); *B33Y 80/00* (2014.12); *B29K 2105/04* (2013.01); *B29L 2031/757* (2013.01)

(58) Field of Classification Search
CPC ............ B29C 33/3842; B29C 44/3434; B29C 44/587
See application file for complete search history.

(56) References Cited

U.S. PATENT DOCUMENTS

| | | |
|---|---|---|
| 4,296,053 A | 10/1981 | Doerer et al. |
| 5,711,905 A | 1/1998 | Behl |

(Continued)

FOREIGN PATENT DOCUMENTS

| | | |
|---|---|---|
| DE | 199 07 279 A1 | 8/2000 |
| DE | 100 07 911 A1 | 8/2001 |

(Continued)

OTHER PUBLICATIONS

International Search Report in PCT/EP2022/052474, mailed Apr. 25, 2022.

(Continued)

*Primary Examiner* — James Sanders
(74) *Attorney, Agent, or Firm* — Collard & Roe, P.C.

(57) ABSTRACT

A tool for the manufacture of foam parts includes walls enclosing a cavity corresponding to the shape of the foam parts to be manufactured, each wall having an inner surface adjacent to the cavity. At least one of the walls has at least one filamentary wall portion which includes at least one part of the inner surface of the respective wall, and which has layers of filamentary filaments running parallel to one another.

19 Claims, 5 Drawing Sheets

(56) References Cited

U.S. PATENT DOCUMENTS

| | | |
|---|---|---|
| 6,620,357 B2 | 9/2003 | Bruning et al. |
| 2004/0247725 A1 | 12/2004 | Ang et al. |
| 2013/0344284 A1 | 12/2013 | Ota |

FOREIGN PATENT DOCUMENTS

| | | |
|---|---|---|
| DE | 101 56 590 A1 | 5/2003 |
| DE | 299 24 215 U1 | 9/2003 |
| DE | 102 31 567 A1 | 1/2004 |
| DE | 10 2006 056 228 A1 | 6/2008 |
| EP | 0 607 809 A1 | 7/1994 |
| EP | 3 338 984 A2 | 6/2018 |
| JP | H07-060761 A | 3/1995 |
| JP | 2015-013423 A | 1/2015 |
| WO | 2019/009704 A1 | 1/2019 |

OTHER PUBLICATIONS

German Search Report dated Jul. 12, 2021 in German Application No. 10 2021 109 197.7, with English translation of the relevant parts.

English translation of the International Preliminary Report on Patentability in PCT/EP2022/052474, mailed Oct. 19, 2023.

"Paper Pulp Molding with FDM Tooling", Technical Application Guide, Stratasys, Inc., version allegedly published in 2017 (11 pages).

FDM Thermoforming Design Guide, Stratasys, Inc., allegedly published in 2014 (23 pages).

Top Reasons to Use FDM Tools for Paper Pulp Molding, Stratasys, Inc., allegedly published in 2017 (6 pages).

TOOL FOR THE MANUFACTURE OF FOAM PARTS

CROSS REFERENCE TO RELATED APPLICATIONS

This application is the National Stage of PCT/EP2022/052474 filed on Feb. 2, 2022, which claims priority under 35 U.S.C. § 119 of German Application No. 10 2021 109 197.7 filed on Apr. 13, 2021, the disclosure of which is incorporated by reference. The international application under PCT article 21(2) was not published in English.

The invention relates to a tool for the manufacture of foam parts according to the preamble of claim 1.

Such tools, which are used for the manufacture of foam parts, for example parts of expanded polypropylene (EPP), are usually made of aluminum. During the manufacturing process, the foam particles are filled into the cavity of the tool and foamed by means of heat input. For this purpose, openings are provided in the walls of the tool or between mutually adjacent walls, in order to blow in steam for heating or in order to let out air displaced by the steam. It is a complex matter to introduce these openings into the walls. Alternatively, tools of metallic sintered material that is permeable to air or steam are used, so that hot steam and displaced air are able to pass directly through the walls. In both cases, however, the metal forming the walls is heated first of all or the walls cool the incoming steam, so that the process has poor energy efficiency.

It is therefore the task of the invention to further develop a tool of the type mentioned in the introduction to the point that it at least largely avoids the disadvantages mentioned above.

This task is accomplished according to the invention by a tool having the features of claim 1. Advantageous further developments of the invention are subject matter of the dependent claims.

The invention is based on the idea of making the walls of the tool at least partly permeable to steam or air, so that steam can be admitted into the cavity and displaced air can be led out of the cavity. This is accomplished in that at least one of the walls is constructed not solidly but instead has at least one filament wall part, which comprises at least one part of the inner face of the associated wall, and which has several layers of thread-like filaments extending parallel to one another. Especially when the filaments consist of a plastic, for example of a polyether imide, a polyamide, a polyester or a material mixture containing at least two of those materials, not only is the tool lightweight but the filament wall part absorbs less heat during admission of hot steam than does a metallic wall part and also cools the steam less, so that the tool is more energy-efficient.

It is preferred that the filaments of mutually adjacent layers extend in different spatial directions. In particular, they may extend in mutually perpendicular spatial directions, so that the filaments are disposed in crisscross relationship. These layers of the filaments are expediently disposed parallel to one another and span mutually parallel planes, which are defined by the central longitudinal axes of the filaments of a layer. Furthermore, it is preferred that each filament wall part have 2 to 30 layers and preferably 10 to 20 layers of filaments and/or be 1 mm to 10 mm thick.

As a rule, the filaments do not lie so densely upon on one another that they prevent the passage of steam or air. However, the passage of steam or air is further improved when the filaments of each layer are at least disposed with space between one another and/or contain interruptions. If a plurality of such purposely created breaks in imperviousness is present, this permits a very efficient passage of steam and input of heat as well as a very efficient discharge of air displaced from the cavity.

Expediently, a bracing structure that preferably consists of the same material as the filament wall part is disposed on the side, facing away from the cavity, of at least one of the filament wall parts and preferably of every filament wall part. In order to facilitate the passage of steam or air through the associated filament wall part, it may be provided that portions of the bracing structure extend through the layers of the filaments and preferably up to the inner face of the associated wall. The bracing structure preferably has a plurality of thread-like bracing filaments, wherein at least some of the bracing filaments expediently extend through the layers of the filaments. In this way, the passage openings already described above may be created in that mutually adjacent filaments are forced away from one another when a bracing filament is passed through them.

Expediently, the ends of some of the bracing filaments extent up to the inner face, so that the passage of steam is facilitated through all filament layers.

The bracing filaments advantageously have a larger cross section than the filaments. Furthermore, they expediently have a curved trajectory at least partly and preferably over their entire length. In this way, steam-passage openings and channels, which permit a good transit of hot steam through the bracing structure to the filament wall part and a good discharge of displaced air, are created in the bracing structure. These openings or channels are then also larger than openings or channels that extend through the filament wall part, where the filaments have a smaller cross section and due to parallel arrangement may lie upon one another over broad stretches. The bracing structure may be described as a structure that is openly porous in all directions.

It may be provided that only one of the walls has a filament wall part. However, it is preferred that each of the walls have at least one filament wall part. Furthermore, it is preferred that the filament wall part of at least one of the walls comprise its entire inner face, so that a large-area admission of hot steam and a large-area discharge of displaced air are possible.

The use of a 3D printing process is preferred for the manufacture of the tool. Delicate structures such as the filament wall parts may also be precisely manufactured with such a 3D printing process.

The invention will be explained in more detail in the following on the basis of an exemplary embodiment illustrated schematically in the drawing, wherein FIG. 1 shows, in perspective view, a tool in the form of a manufacturing mold for the manufacture of foam parts;

Figure 4A:
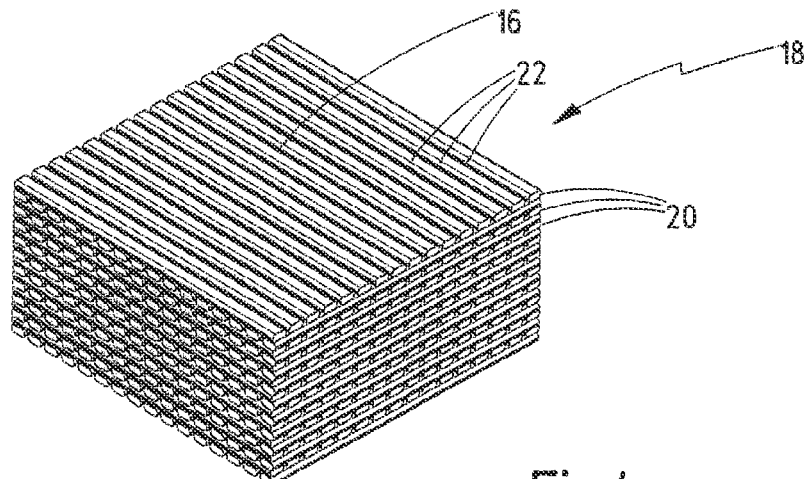
Figure 4B:
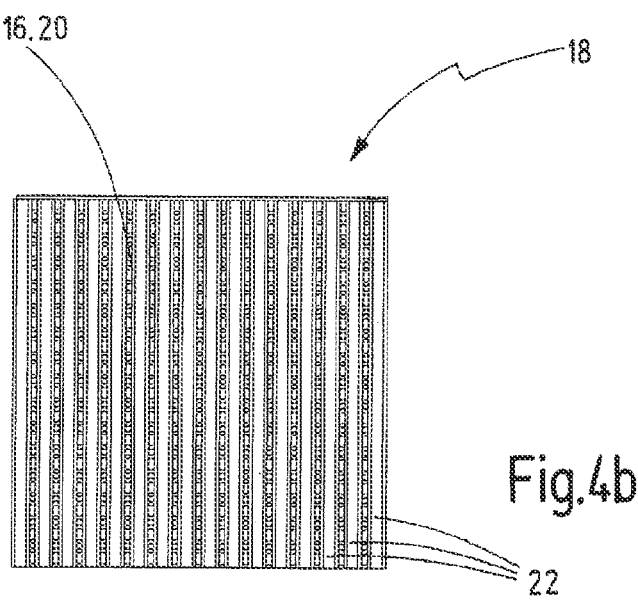
Figure 4C:
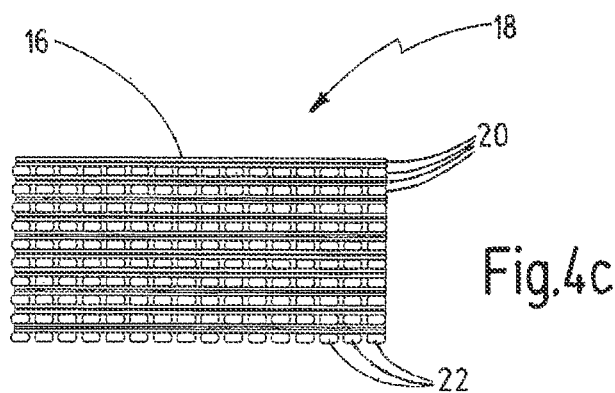
Figure 5A:
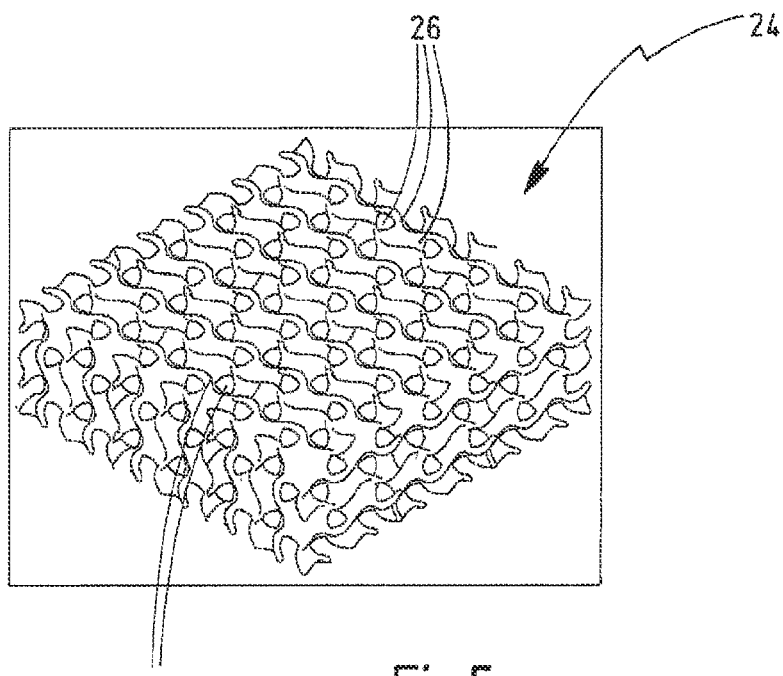
Figure 5B:
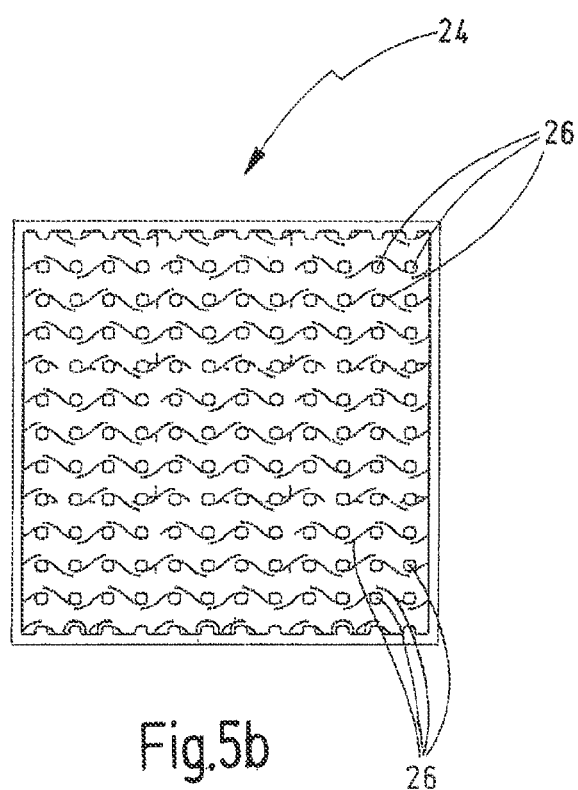

FIGS. 4*a-c* show a filament wall part in schematic representation in perspective view, in plan view and in side view, and FIGS. 5*a, b* show a bracing structure in schematic representation in perspective view and in plan view.

The tool 10 illustrated in the drawing is used for the manufacture of molded parts of foam. It has walls 12, which enclose a cavity 14, the shape and size of which correspond to the shape and size of the molded part to be manufactured and therefore represent its negative. This cavity 14 is bounded by the inner faces 16 of the walls 12.

Figure 1:
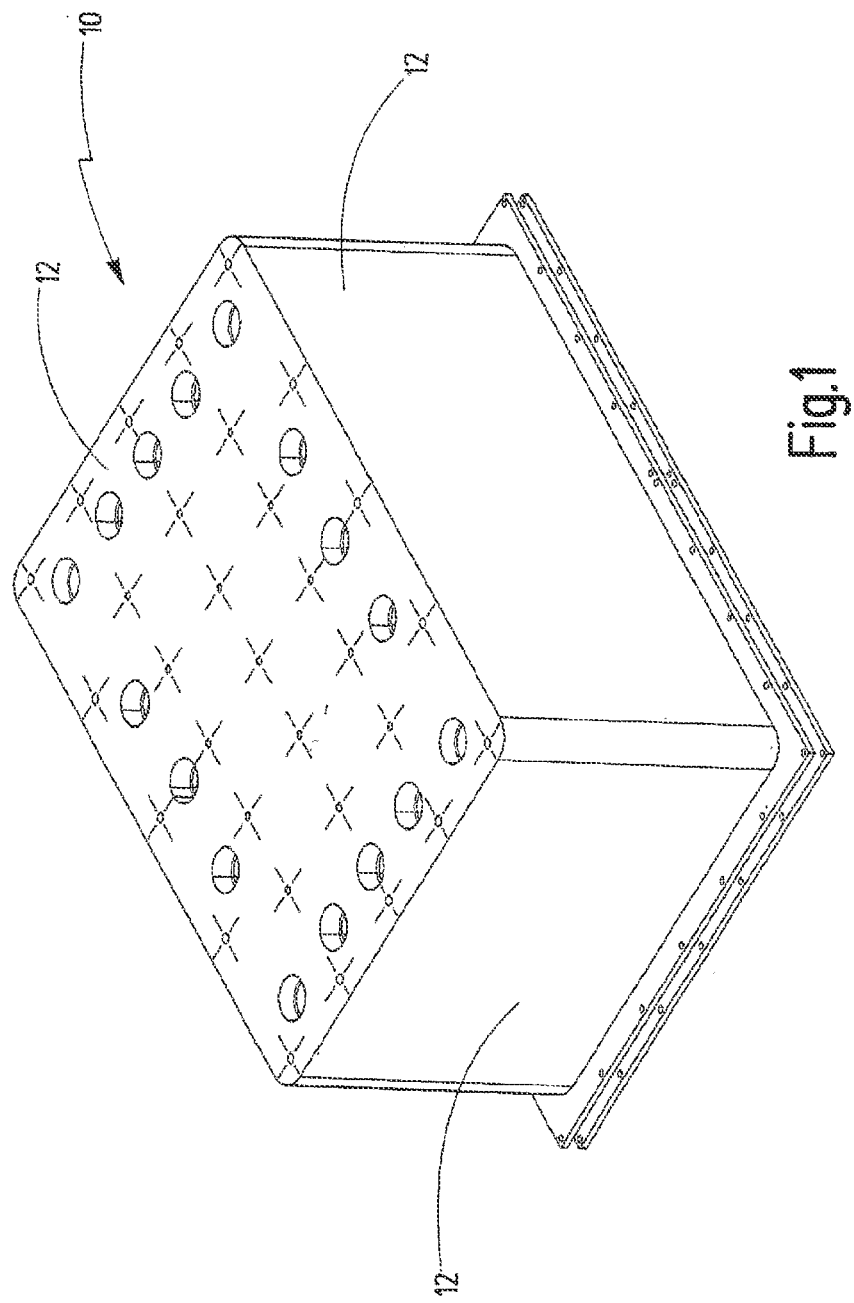
Figure 2:
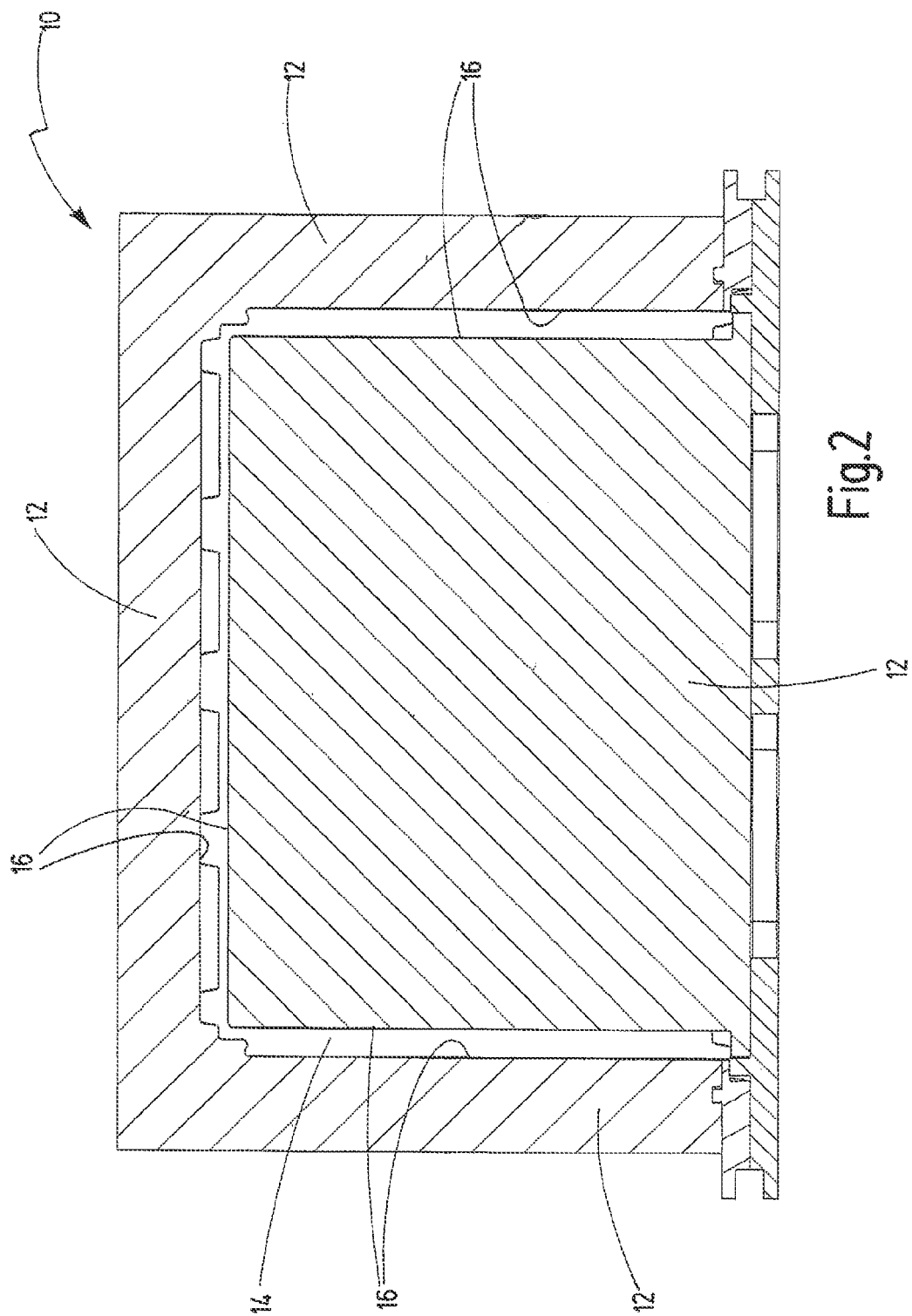
FIG. 2 shows a section through the tool according to FIG. 1.
Figure 3:
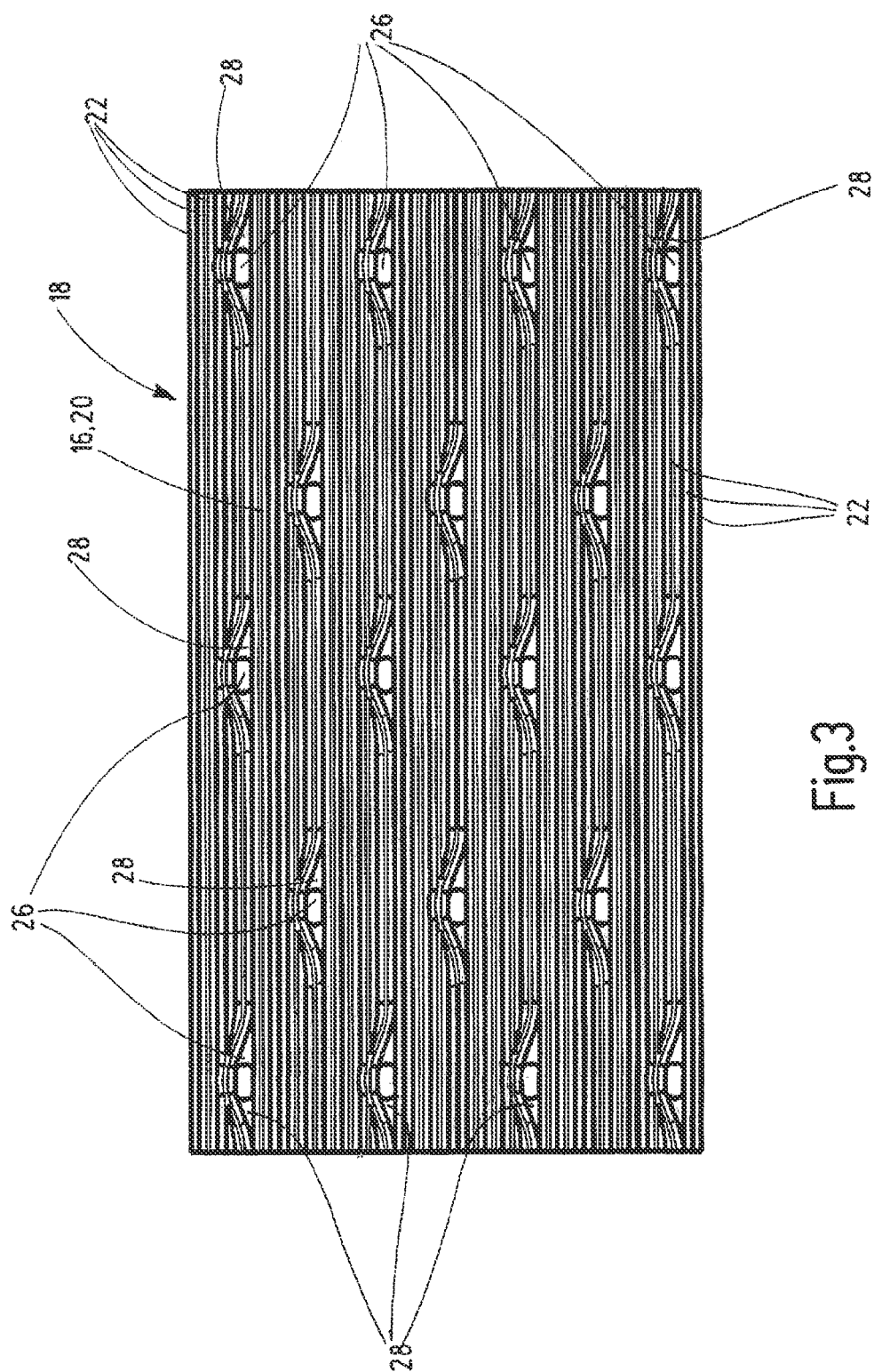
FIG. 3 shows a plan view of an inner face of the tool according to FIGS. 1 and 2.

Each of the walls 12 has a filament wall part 18, which respectively comprises the entirety or a large part of the inner face 16 of the associated wall 12. Each filament wall part is formed from several layers 20, twenty in the illustrated exemplary embodiment, of thread-like filaments 22 of a plastic, wherein the filaments 22 of each layer 20 extend parallel to one another and lie upon one another. The filaments 22 of the adjacent layer 20 extend perpendicular to the filaments 22 of the first-mentioned layer 20, so that the filaments 22 of mutually adjacent layers always extend in different spatial directions oriented perpendicular to one another. The layers 20 span planes extending parallel to one another. The topmost layer 20 facing the cavity 14 can be seen in FIG. 3. On the side of each filament wall part facing away from the inner face 16, a bracing structure 24 is disposed that is formed from bracing filaments 26, which are likewise thread-like but respectively have, over their entire length, a curved trajectory and a larger cross section than the filaments 22. Some of the bracing filaments 26 extend through the associated filament wall part 18 and end at the associated inner face 16. Thereby loopholes 28, at which mutually adjacent filaments 22 are disposed with space between one another in some places, exist between the filaments 22 in the filament wall part 18.

For the manufacture of a molded part, the cavity 14 is filled with foam particles. Hot steam is admitted through the walls 12 into the cavity 14, and air present in the cavity 14 is displaced through the walls 12. In the process, the bracing structures 24 form passage channels for steam and air on the basis of the curved and interwoven bracing filaments 26, while the loopholes 28 connected to these form further passage channels for the passage of steam and air through the filament wall parts 18.

The tool 10 is manufactured by 3D printing from a plastic or a plastic mixture. In the process, the filament wall structures 18 and the bracing structures 24 consist of the same material.

In summary, the following statement is applicable: the invention relates to a tool 10 for the manufacture of foam parts, which tool has several walls 12, which enclose a cavity 14 corresponding to the shape of the foam parts to be manufactured, wherein each wall 12 has an inner face 16 adjoining the cavity 14. According to the invention, it is provided that at least one of the walls 12 has at least one filament wall part 18, which comprises at least one part of the inner face 16 of the associated wall 12, and which has several layers 20 of thread-like filaments 22 extending parallel to one another.

The invention claimed is:

1. A tool for the manufacture of foam parts, which tool has several walls (12), which enclose a cavity (14) corresponding to the shape of the foam parts to be manufactured, wherein each wall (12) has an inner face (16) adjoining the cavity (14), wherein at least one of the walls (12) has at least one filament wall part (18), which comprises at least one part of the inner face (16) of the associated wall (12), and which has several layers (20) of thread-shaped filaments (22) extending parallel to one another.

2. The tool according to claim 1, wherein the filaments (22) of mutually adjacent layers (20) extend in different spatial directions.

3. The tool according to claim 2, wherein the filaments (22) of mutually adjacent layers (20) extend in mutually perpendicular spatial directions.

4. The tool according to claim 1, wherein the layers (20) are disposed parallel to one another and span mutually parallel planes.

5. The tool according to claim 1, wherein each filament wall part (18) has two to thirty layers (20) and preferably ten to twenty layers (20) of filaments (22).

6. The tool according to claim 1, wherein each filament wall part (18) is 1 mm to 10 mm thick.

7. The tool according to claim 1, wherein the filaments (22) consist of comprise a polyether imide, a polyamide, a polyester, a metal-containing material or a material mixture containing at least two of those materials.

8. The tool according to claim 1, wherein the filaments (22) of each layer (20) are at least partly disposed with space between one another and/or contain interruptions.

9. The tool according to claim 1, wherein a bracing structure (24) that preferably comprises the same material as the filament wall part (18) is disposed on the side, facing away from the cavity (14), of at least one of the filament wall parts (18) or of every filament wall part (18).

10. The tool according to claim 9, wherein parts of the bracing structure (24) extend through the layers (20) of the filaments (22) and/or to the inner face (16) of the associated wall (12).

11. The tool according to claim 9, wherein the bracing structure (24) has a plurality of thread-shaped bracing filaments (26).

12. The tool according to claim 11, wherein at least some of the bracing filaments (26) extend through the layers (20) of the filaments (22).

13. The tool according to claim 12, wherein at least the ends of some of the bracing filaments (26) extend up to the inner face (16) of the associated wall (12).

14. The tool according to claim 11, wherein the bracing filaments (26) have a larger cross section than the filaments (22).

15. The tool according to claim 11, wherein the bracing filaments (26) have a curved trajectory that extends at least partly or fully their entire length.

16. The tool according to claim 1, wherein each of the walls (12) has at least one filament wall part (18).

17. The tool according to claim 1, wherein the filament wall part (18) of at least one of the walls (12) comprises its entire inner face (16).

18. The tool according to claim 1, wherein the filaments (22) and if necessary the bracing filaments (26) are manufactured by means of a 3D printing process.

19. A method for the manufacture of the tool according to claim 1, wherein the filaments (22) and if necessary the bracing filaments (26) are manufactured by means of a 3D printing process.

* * * * *

UNITED STATES PATENT AND TRADEMARK OFFICE
CERTIFICATE OF CORRECTION

| | | |
|---|---|---|
| PATENT NO. | : 12,370,726 B2 | Page 1 of 1 |
| APPLICATION NO. | : 18/284101 | |
| DATED | : July 29, 2025 | |
| INVENTOR(S) | : Markus Feurer | |

It is certified that error appears in the above-identified patent and that said Letters Patent is hereby corrected as shown below:

In the Claims

In Claim 7, Line 2 (Column 4, Line 16): delete "consist of"

In Claim 10, Line 3 (Column 4, Line 29): after "and/or" add --up--

In Claim 15, Line 3 (Column 4, Line 45): after "fully" add --over--

Signed and Sealed this
Twenty-sixth Day of August, 2025

Coke Morgan Stewart
*Acting Director of the United States Patent and Trademark Office*